United States Patent [19]
Papetti

[11] 4,046,839
[45] Sept. 6, 1977

[54] COMPOSITIONS HAVING HIGH IMPACT AT LOW RUBBER LEVELS

[75] Inventor: Stelvio Papetti, Leominster, Mass.

[73] Assignee: Foster Grant Co., Inc., Leominster, Mass.

[21] Appl. No.: 608,934

[22] Filed: Aug. 29, 1975

Related U.S. Application Data

[62] Division of Ser. No. 370,108, June 14, 1973, abandoned.

[51] Int. Cl.² .................................................. C08L 9/08
[52] U.S. Cl. .................................................. 260/880 R
[58] Field of Search .................................... 260/880 R

[56] References Cited

U.S. PATENT DOCUMENTS

| | | | |
|---|---|---|---|
| 3,288,887 | 11/1966 | Yoshino | 260/880 R |
| 3,370,105 | 2/1968 | De Bell | 260/880 R |
| 3,436,440 | 4/1969 | Abe | 260/880 R |
| 3,632,683 | 1/1972 | Cusano | 260/880 R |
| 3,751,526 | 8/1973 | Okasaka | 260/880 R |
| 3,758,640 | 9/1973 | Thorpe | 260/880 R |
| 3,855,355 | 12/1974 | Moore | 260/880 R |

*Primary Examiner*—Paul R. Michl

[57] ABSTRACT

ABS polymers having improved physical properties are prepared by graft polymerizing, in an aqueous medium and in the presence of an effective amount of suspending agent and polymerization catalyst, styrene and acrylonitrile onto a butadiene polymer in the form of a latex, said butadiene polymer latex being characterized by a particle size of about 1000 to 3000 A, a gel content of about 20-85% by weight, and a swell index of about 18-150.

13 Claims, No Drawings

COMPOSITIONS HAVING HIGH IMPACT AT LOW RUBBER LEVELS

This is a divisional of application Ser. No. 370,108 filed on June 14, 1973 now abandoned.

BACKGROUND OF THE INVENTION

This invention relates to ABS-type polymers and more particularly to an improved process for preparing ABS-type polymers having excellent physical properties.

Over the past few years acrylonitrile-butadiene-styrene polymer, more commonly known as ABS polymers, have taken over a large share of the market formerly held by other impact polymeric materials such as impact polystyrene. The constantly increasing demand for these polymers is due to the excellent mechanical and chemical properties that they possess; for instance ABS plastics have greater toughness and impact strength than impact polystyrenes containing the same amounts of rubber and they also possess excellent chemical solvent resistance.

In spite of the excellent mechanical and chemical properties of ABS polymers their growth in the plastics market has been somewhat hindered due to disadvantages associated with the method of commercial production of ABS polymers. Today, by far the greatest amount of ABS polymer on the market is produced by conventional emulsion polymerization techniques. Unfortunately, the prolonged polymerization periods and multi-step post polymerization processing necessary in emulsion type processes often render products made by this type of process economically unsuitable for many producers. In addition, residual emulsifier and other agents still present in the polymer due to incomplete purfication cause some deterioration in the properties of the polymer. For these reasons more efficient and economical processes for producing ABS polymers having acceptable properties are constantly being sought.

An additional problem heretofore presented by conventional ABS manufacturing processes is that the high levels of rubber (polybutadiene) which must be employed to obtain products having acceptable impact properties cause detrioration in other properties of the ABS such as surface properties, gloss molding properties and also present various reaction difficulties such as increased viscosity of the reaction mixture.

Recently, a patent has issued to DeBell et al (U.S. Pat. No. 3,370,105) which discloses a process wherrein the rubbery material onto which the styrene and acrylonitrile are grafted is orginally in the form of a latex but is coagulated prior to the initiation of the polymerization. While this process presents certain advantages it still suffers from process disadvantages such as the need to add coagulant and results in a product which does not have the superior properties exhibited by the product of the present invention.

In another recently issued U.S. Pat. No. 3,436,440, Abe et al disclose an emulsion-suspension process involving the graft polymerization of a mixture of styrene and acrylonitrile onto a butadiene rubbery polymer in latex form. In this process the rubber latex, monomers, a suspending agent, a water-soluble catalyst and an oil-soluble catalyst are all introduced into a reactor; the contents are heated to polymerization temperature and the reaction proceeds in the emulsion state. After the polymerization has proceeded to a certain point the emulsion coagulates and forms a stable suspension. The polymerization is then completed in suspension. The process of this reference obviates many of the disadvantages associated with conventional emulsion procedures but the products prepared do not have the exceptionally good combination of properties exhibited by the products of the present invention. Furthermore, this reference does not disclose or suggest the process of the present invention wherein products having consistently good properties are prepared and wherein compositions of low rubber level and excellent properties are prepared.

There is therefore a need for a process for preparing ABS polymer which avoids the disadvantages of the prior art emulsion processes, which results in polymer having a desirable combination of properties such as light color, high impact, the flow, and which employs low rubber levels to prepare polymer having desirable properties.

SUMMARY OF THE INVENTION

In accordance with the present invention there is provided an improved process for graft copolymerizing, in the presence of a free radical polymerization catalyst and an effective amount of suspending agent, a monovinyl aromatic monomer and a monomer of the formula

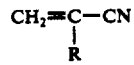

wherein R is H or lower alkyl onto an elastomeric diene polymer in latex form in an aqueous medium, said elastomeric latex consisting essentially of a polybutadiene latex having a particle size of about 1000-3000 A, a gel content of about 20-85% by weight, a swell index of about 18-150.

Also provided in accordance with the present invention are ABS polymers having a unique combination of properties. Such compositions are graft copolymrs of polybutadiene, styrene and acrylonitrile which have a polybutadiene content of about 12 to about 19% by weight, an Izod Impact resistance in ft. lbs/in. of notch of at least about 8 and a ratio of shear stress at 868 sec$^{-1}$ (psi) to Izod Impact resistance in ft. lbs. per inch of notch of less than about 4. The Izod Impact resistance is determined in accordance with ASTM D-256 and the shear stress is determined on a Monsanto capillary melt Rheometer at 232° C.

DETAILED DESCRIPTION OF THE INVENTION

The term monovinyl aromatic monomer has its usual meaning and includes those polymerizable compounds containing an aromatic nucleus attached to an aliphatic hydrocarbon radical which contains a vinyl group. Typical members of this class include, for example, styrene, alphamethylstyrene and vinyl toluene. The monomers of the formula

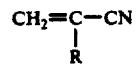

useful in the present invention include, for example, acrylonitrile and methacrylonitrile.

The elastomeric latex employed in the present invention is critical in order to achieve polymers having an improved and unexpected set of properties. Useful latices are those which have a particle size of about 1000–3000 A, preferably 1500 to 2500 A, a gel content of about 20–85% by weight, preferably 20 to 65% by weight, and a swell index of about 18–150, preferably 30 to 100. Particle size is conveniently determined by electron microscopy.

Typically the latices useful in this invention have a solids content of about 5 to about 70% by weight, preferably 20–65% by weight.

Latices having a soap content of about 2–5% by weight and employing potassium salt emulsifying agents have been found to be particularly useful.

The following commercially available polybutadiene latices are particularly useful in the present invention:

which have been found to produce the superior results of the invention are those having the formula:

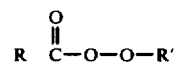

These compounds are generally known as peroxy esters or simply peresters. R, in the above formula, represents a hydrocarbon radical preferably containing up to about 8 carbon atoms. In general the best performance is obtained when R is an alkyl group and contains one to about 8 carbon atoms. In a preferred embodiment R is a tertiary alkyl compound, and particularly good reduls are obtained when R is the tertiarybutyl radical.

R', in the above catalyst formulation, represents a tertiary alkyl radical preferably containing up to about

| Latex Name | Manufacturer | Characteristics |
|---|---|---|
| Pliolite 2104 | Goodyear Tire & Rubber Co. | pH 10–11<br>Surface Tension 37–41<br>Viscosity 800–1800 cps at 25° C.<br>Mooney (ML-4) 110–145<br>Solids Content 59–62% by weight<br>Particle Size 1500–2500<br>Gel Content 26–37% by weight<br>Swell Index 85–105 |
| Polysar 710 | Polysar Corp. | Total solids content (%) 60.0<br>pH 10.5<br>Viscosity (Brookfield LV, Spindle No. 3)<br>-at 12 rpm (poises) 11.5<br>-at 30 rpm (poises) 12.0<br>Coagulum on 80 mesh screen (% of dry weight) 0.05<br>Surface tension at 15% solids (dyne/cm) 35.0<br>Average particle size (Angstrom units) 1500<br>Specific gravity 0.940 |
| Intex 151 | International Synthetic Rubber Company, Ltd. | pH 11–12<br>Solids 19–24%<br>Particle Size 1700–2100A<br>Gel Content 75%<br>Swell Index 22 |

A particularly preferred latex for use in the present invention is Pliolite 2104 manufactured by The Goodyear Tire and Rubber Company and having the following essential characteristics:

| Particle Size: | 1500–2500 A° |
|---|---|
| Gel Content: | 26–37% by weight |
| Swell Index | 85–105 |

Preferred latices within the scope of this invention frequently are prepared from a polybutadiene prepared by polymerization at about 5°14 15° C., the polymerization being terminated at 50–80% conversion.

When this particular butadiene latex is employed in accordance with the present invention, a product is formed having an exceptionally good combination of mechanical (particularly impact resistance), flow, and visual properties.

While improved results can be achieved on a relative basis when the process of the present invention is used with any conventional free radial polymerization catalyst (of the type employed in the hereinbefore cited references for example), it has been found that catalysts 8 carbon atoms. In a preferred embodiment of the invention at least one of the groups attached to the tertiary carbon atoms is the methyl group and particular good results have been obtained when all of the alkyl groups attached to the tertiary carbon atoms are methyl groups, that is, when R' is the tertiary butyl radical. Examples of preferred catalysts used in the process of the invention are t-butyl peroxy isobutyrate, t-butyl peroxy pivalate and t-butyl peroxy octoate and mixtures of these.

The preferred catalysts of this invention may be prepared by any desired method. For example, they can be conveniently prepared by reacting hydroperoxides with organic acid chlorides or organic acid anhyrides. The preparation of these catalysts forms no part of the present invention.

The amount of catalyst used in the processes of the invention may vary from about 0.05% to about 0.8% based on the total weight of monomer present. In the preferred embodiment the catalyst concentration may vary from about 0.1 to 0.5%, bases on the total weight of monomer.

The above class of organic peroxide catalyst have been found to function exceptionally well in the invention. The preferred members of this class of catalyst all have two hour half-life temperatures between about 50°–100° C. Other members of this group which have two hour half-life temperatures substantially about 100° C., such as t-butyl perbenzoate, which has a two hour half-life temperature of about 117° C., can also be satisfactorily used in the invention; however, processes involving the use of these catalysts may require the modification of the reactor and auxiliary apparatus to accommodate the super-atmospheric pressures developed at temperatures considerably above about 100° C.

The suspending agent is added to the polymerization reaction mixture to facilitate the establishment of a stable suspension. A wide variety of useful suspending agents are known to those of skill in the art. In accordance with a preferred embodiment of the present invention it has been found that a particularly useful suspending system is a mixture of a water-soluble polyalkylene oxide and a second polymeric water-soluble organic compound; an especially useful suspending agent of this type is a mixture wherein said polyalkylene oxide is selected from the group consisting of polyethylene oxide, polypropylene oxide, polyethylene oxide-polypropylene oxide copolymers and mixtures of these and is present in an amount of about 0.005 to about 0.4 part per 100 parts of water in the polymerization system and wherein said second polymeric water-soluble organic compound is selected from the group consisting of partially hydrolyzed polyvinylesters of monocarboxylic acids, polyglycols, solubilized cellulose derivatives, gelatins, water-soluble alginates and mixtures of these and is present in an amount of about 0.05 to 2.0 parts per 100 parts of water. A particularly preferred suspending agent of this type is a mixture wherein the polyalkylene oxide is a polyethylene oxide and the second polymeric water-soluble organic compound is polyvinyl alcohol.

The suspending agent may be added prior to polymerization or at various times during polymerization. The optimum amount of suspending agent necessary to establish a stable suspension for any given polymerization system can be readily determined by those of skill in the art.

It is sometimes desirable to produce a polymer with a molecular weight in a specific range or with a high degree of grafting. This can be accomplished by adding small amounts of chain regulating agents such as mercaptans to the polymerization mixture, either prior to, or during the polymerization. Typical chain transfer agents which can be used are dodecyl mercaptan and alpha-methylstyrene dimers. Other additives may also be incorporated into the polymerization formulation to modify the properties of the product. Thus, anti-oxidants may be added to prevent oxidation and resulting coloration of the polymer. Similarly, dyeing agents may be added to the reaction mixture prior to or during the polymerization reaction. Typical additives include, for example, high molecular weight lubricants which are compatible with the ABS composition such as metallic stearates, mineral oil, bis-stearamides, phosphate esters, glycol diesters of fatty acids, stearate esters, fatty alcohols, and combinations of the above; anti-oxidants such as hindered phenols, dilauryldithiopropionate, and phosphite esters. The lubricants are conveniently employed in amounts of up to about 6% by weight and anti-oxidants are conveniently employed in amounts up to about 1% by weight.

According to the preferred mode of operation the polymerization reaction mixture is prepared by combining, in a suitable reaction vessel equipped with an agitator, water, the rubbery latex, the monovinyl aromatic monomer and nitrile monomer, one or more of the above-described catalysts, suitable suspending agents, and any other additives that it may be desired to include at this time. Agitation is commenced and the reaction mixture is heated to a temperature suitable for polymerization. Generally, the polymerization is carried out at a temperature of about 40° to about 130° C. although lower or higher temperatures may be employed if desired. After the initial polymerization phase the reaction mixture converts to a stable suspension. The reaction then proceeds with the polymeric particles and unreacted monomer being stably suspended in the aqueous medium. When the desired degree of polymerization is reached, the reaction mixture is cooled down and the polymeric product in particulate form is separated from the aqueous medium, washed and dried. If any unreacted monomer remains in the reaction mixture it may be stripped off prior to the cooling step.

It may be desirable to conduit the polymerization in a closed system to prevent the escape into the atmosphere of nitrile monomer or other volatile components of the reaction mixture. This is especially important when the polymerization is to be conducted at temperatures above about 70° C. Additionally, it may be desired to conduct the reaction under an inert atmosphere, in which case nitrogen or some other inert gas may be introduced into the vapor space above the reaction mixture. Similarly, it may be desirable to polymerize the reactants at temperatures above the boiling point of the aqueous medium. In this case the reaction is conducted at superatmospheric pressures and the pressure may be the autogeneous pressure or super autogeneous pressures obtained by means of an inert gas. When the polymerization reaction is to be carried out at elevated temperatures a catalyst having a suitable 2 hour half-life temperature is selected.

In an alternative embodiment of the process it may be desirable to carry out the polymerization in two stages. In the first stage the reaction is conducted at a lower temperature for example at about 40° C. to about 90° C. At the completion of the first stage, which will be at some period after the system converts to the suspension state, the temperature of the reaction medium is raised to about 70° to 130° C. and maintained in this range until the polymerization is completed. An advantage of a two stage process over a single stage process is that there is less residual monomer remaining in the final product. When the two stage process is employed, the catalyst system may be comprised of a single catalyst which may all be added initially or in two or more increments, the first increment being before the polymerization and the subsequent increments being added at selected times during the polymerization. A combination of catalyst may also be used in the two stage process, a first stage or low temperature catalyst having a relatively low, two hour half-life temperature, for example about 40° to 100° C. and a second stage or high temperature catalyst having a two hour half-life temperature in the range of about 80° to 130° C. The second stage catalyst may be added initially with the first stage catalyst or at the completion of the first stage of polymerization.

The preferred principal monomers used in the invention are styrene and acrylonitrile. The amount of monomer added to the reaction mixture can in general vary such that the final product contains about 81–88% converted monomer. The relevant amount of styrene and acrylonitrile is not critical and the amount of acrylonitrile preferably varies between about 15% to 40%, based on the total amount of monomer in the reaction mixture. It is frequently convenient to use the azeotropic combination of styrene and acrylonitrile, that is about 24 parts of acrylonitrile per each 76 parts of styrene.

Other monomeric or polymeric components may be present in the reaction mixture, provided that their presence does not adversely affect the polymerization or the properties of the finished product. For example, vinyl monomers such as vinyl chloride, acrylic esters and vinyl aromatic monomers may be added in small amounts to the polymerization mixture without materially affecting the properties of the polymer. In addition, a portion of the styrene may be replaced by alphamethylstyrene or chlorostyrene where it is desired to produce a polymer having a high heat distortion temperature. Similarly, other monomeric materials may be added to change the color or improve the transparency of the polymer. Methylmethacrylate can, for example, be employed to prepare a polymer having improved clarity.

Typically, the polymeric compositions of the present invention can be prepared by 1. adding to an aqueous emulsion medium in a suitable reaction vessel
   a. about 12 to about 19 parts by weight polybutadiene, said polybutadiene being in latex form and said latex having a polybutadiene particle size of about 1000–3000 Å, a gel content of about 29–85% by weight and a swell index of about 18–150.
   b. about 88 to 81 parts by weight of a mixture of about 15 to about 40 parts by weight of acrylonitrile and about 60 to about 85 parts by weight of styrene.
   c. about 0.2–0.5% by weight of water in the reaction mixture of total suspending agent
   d. about 0.1 to about 0.5% by weight of a free radical polymerization catalyst;
2. heating the contents of said reaction vessel to about 50 to about 100° C. and maintaining the temperature in this range for about 4–8 hours, and
3. recovering the product from the reaction vessel.

Novel ABS compositions are also provided in accordance with this invention. Such compositions are prepared in accordance with the processes hereinbefore described. The novel compositions of this invention consist essentially of about 12 to about 19% by weight polybutadiene based on the total weight of polymer in the composition and about 81 to about 88% by weight styrene-acrylonitrile copolymer based on the total polymer in the composition, said polymeric composition having an Izod Impact strength in foot pounds per inch of notch determined by ASTM of at least about 8 and a ratio of Shear Stress at $868^{-1}$ sec to Izod Impact in foot pounds per inch of notch of less than about 4. It should be noted that the Impact and Shear values given above as well as the impact and shear values of the claimed compositions represents values as determined by standard ASTM methods for fully formulated, commercially useable polymeric compositions as will be prepared in commericial polymer plants. The impact being determined on injection molded samples. Unformulated, laboratory polymer will have different numerical values for these properties but will still have markedly superior properties as compared to prior art compositions at such low rubber levels.

The styrene-acrylonitrile copolymer portion of the composition conveniently contains about 60 to about 85% by weight of units derived from styrene.

A preferred composition within the scope of the present invention contains about 16 to about 18% by weight of polybutadiene and has an Izod impact in foot pounds per inch of notch of at least about 9 and a ratio of Shear Stress at $868^{-1}$ sec to Izod Impact in foot lbs. per inch of notch of about 2.5–4. A particularly preferred composition contains about 17% by weight polybutadiene and has an Izod Impact of about 12 foot pounds per inch of notch and a Shear Stress at $868^{-1}$ sec of about 38.

The compositions of this invention can of course be blended with other compatible compositions when desired. Preferred blends include, for example, a blend with styrene-acrylonitrile copolymers.

Of course ABS compositions having rubber levels less than 12% can be prepared in accordance with the process of the present invention and such compositions will have superior impact and flow properties as compared to prior art compositions having comparable rubber levels.

As hereinbefore stated, the values given for the properties of the compositions of this invention are representative for formulated, commercially saleable product. The formulations are conventional and do not represent part of the present invention.

Unformulated, laboratory compositions (i.e., containing no lubricant but containing conventional amounts of anti-oxidant) prepared in accordance with the present invention generally have an Izod Impact in foot pounds per inch of at least about 6, preferably at least about 8, and have a ratio of Shear Stress at $868^{-1}$ to Izod Impact of less than about 6, preferably less than about 5. These values are, of course, for compositions of the present invention having rubber levels of about 12–19% by weight. These values are based on compression molded samples.

No previously known ABS compositions have had the desirable combination of properties achieved by the compositions of the present invention at such low rubber levels.

While rubber levels of about 12–19% are suitably and presently most conveniently employed in the compositions of the present invention higher rubber levels can be used for processes having increased efficiency and for certain product advantages. Rubber levels as high as about 40% or higher by weight may be employed if proper adjustments are made as needed in the manufacture and rubber levels up to about 25% may prove to be attractive in certain applications requiring very high impact resistance.

EXAMPLE

ABS polymer is prepared as follows:

The apparatus for the polymerization consists of a five liter glass resin kettle equipped with steel head fitted with a thermometer a mechanical stirrer pressure gauge and gas inlet tube connected to a pressure release valve. Polymerization, with 20% solids, is conducted by charging the reactor with 3050 g of distilled water, 281 g of rubber latex (type indicated in Tables), 700 g of 2.5% solution of polyvinyl alcohol (0.45% by weight based on total water) and 100 g of 0.5% solution of polyethylene oxide (0.014% by weight polyethylene oxide based on total water). To this charge are added 521 g styrene, 211 g acrylonitrile, 3.5 g of antioxidant as a 10% solution by weight in acrylonitrile, and a solution of 1.8 g t-butyl peroxy pivalate, 0.54 g of t-butyl peroctoate and t-dodecyl mercaptan in an amount as indicated in the Tables in 25 g of styrene.

The reaction mixture is heated in an oil bath at 68° C. for 4 hours and at 100° C. for 1 hour. The mixture is agitated during heating. The reaction product is separated in the form of beads and washed with water in a stainless steel screen basket and dried.

The dried beads are blended with antioxidant and passed through an extruder which for laboratory products is about two feet long and one inch in diameter. The temperature of the extruder which increases slightly from the feed end to the discharge end is about 400° to 420° F. The extruded polymer in the form of a strand is passed through a water bath for cooling and is chopped into pellets. The extruder functions to both densify the reaction product and it also makes the product more uniform since mixing takes place in the extruder. The pellets are then either compression or injection molded as follows:

I. Procedure for Compression Molding
  A. Preheat press to 350° F.
  B. Cover stainless platens, which form upper and lower surfaces of mold, with aluminum foil. Spray surface of aluminum foil and mold surfaces with mold release agent.
  C. Fill mold resting on bottom platen with resin in pellet form. Place top platen over mold.
  D. Place filled mold sandwiched between the two platens in the press. Close press increasing pressure to 10 tons and then release. Increase pressure to 20 tons and then release. Finally increase pressure to 30 tons and hold for 10 minutes.
  E. Cool to 75° F.
  F. Release pressure.
  G. Remove mold from press and remove molded sample from mold.

II. Procedure for Injection Molding

The Resin is dry blended with an antioxidant and lubricant priot to charging to the injection molding machine. It is then charged to the injection press operating under the following conditions:

| Cylinder Temp. | 440° F. |
| Die Temp. | 160° F. |
| Pressure | 900 psi |
| Cycle | 33 sec. |

The ejected molded sample is separated from the molding sprue.

The physical properties of the polymer and molded ABS compositions are then determined in accordance with standard ASTM methods. The results are given in the Tables.

TABLE I

| Rubber Latex | Pliolite 2104 (Ave. 2 Runs) | Polysar 710 (Ave. of 3 Runs) |
|---|---|---|
| Mercaptan Level | 2.4 g | 2.4 g |
| Izod Impact (ft. lbs./in.) | >13 | >13 |
| Tensile Stress at yield | 4500 | 4100 |
| Elastic Modulus × 10⁵ | 2.25 | 2.15 |
| Shear Stress at 868 sec⁻¹ | 55 | 57 |
| Ratio of Shear to Izod | <4.2 | <4.2 |

Test data are from compression molded specimens

TABLE II

The following data is based on polymer prepared as in the previous discussion but scaled up to pilot plant quantities and having lubricant in an amount of 4.76% by weight based on polymer incorporated prior to the extrusion step.

| Rubber Latex | Pliolite 2104 | Polysar 710 |
|---|---|---|
| Mercaptan | 0.4% by weight based on polymer | 0.35% by weight based on polymer |
| Shear Stress at 868 sec⁻¹ | 35.1 | 39.2 |
| Izod Impact (ft. lbs./in.) (Injection Molded) | 10.1 | 11.6 |
| Ratio Shear/Izod | 3.5 | 3.4 |

I claim:

1. A process for graft polymerizing a mixture containing styrene and acrylonitrile onto polybutadiene in the form of a latex by effecting the polymerization in the presence of a catalyst and an effective amount of suspending agent wherein the improvement consists essentially of using a polybutadiene latex which has a particle size of about 1500–2500 A, a gel content of about 26–37 % by weight and a swell index of about 85–105.

2. The process of claim 1 wherein the polybutadiene used was prepared by polymerization at a temperature of about 5°–15° C., said polymerization being terminated at 50–80% conversion.

3. The process of claim 1 wherein the catalyst is a compound of the formula:

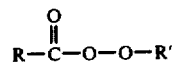

wherein R is an alkyl group having 1-8 carbon atoms and R' is a tertiary alkyl group having up to 8 carbon atoms.

4. The process of claim 3 wherein the catalyst is at least one of tertiarybutyl peroxy isobutyrate, tertiarybutyl peroxy actoate, or tertiarybutyl peroxy pivalate.

5. The process of claim 1 wherein the suspending agent is a mixture of a water-soluble polyalkylene oxide and a second polymeric watersoluble organic compound.

6. The process of claim 5 wherein said polyalkylene oxide is selected from the group consisting of polyethylene oxide, polypropylene oxide, polyethylene oxide-polypropylene oxide copolymers and mixtures of these and is present in an amount of about 0.005 to about 0.4 part per 100 parts of water in the polymerization system and wherein said second polymeric water-soluble organic compound is selected from the group consisting of partially hydrolyzed polyvinylesters of monocarboxylic acids, polyglycols, solubilized cellulose derivatives, gelatins, watersoluble alginates and mixtures of these and is present in an amount of about 0.05 to 2.0 parts per 100 parts of water.

7. The process of claim 6 wherein the polyalkylene oxide is polyethylene oxide and the second polymeric water-soluble organic compound is polyvinyl alcohol.

8. A process for preparing a styreneacrylonitrile grafted polybutadiene polymeric composition, which composition consists essentially of about 12 to about 19% by weight polybutadiene based on the total weight of polymer in the composition and about 81 to about 88% by weight styrene-acrylonitrile copolymer based on the total polymer in the composition, said polymeric composition having an Izod Impact Strength in foot pounds per inch of notch determined by ASTM D-256 of at least about 8 and a ratio of Shear Stress at 868$^{-1}$ second to Izod Impact Strength in foot pounds per inch of notch of less than about 4, by:

1. adding to an aqueous emulsion medium a suitable reaction vessel
   a. about 12 to 19 parts by weight polybutadiene, said polybutadiene being in latex form and said latex having a polybutadiene particle size of about 1500-2500 A, a gel content of about 26-37% by weight and a swell index of about 85-105.
   b. about 88 to 81 parts by weight of a mixture of about 15 to about 40 parts by weight of acrylonitrile and about 60 to about 85 parts by weight of styrene.
   c. about 0.2-0.5% by weight of water in the reaction mixture of total suspending agent.
   d. about 0.1 to about 0.5% by weight of a free radical polymerization catalyst.
2. heating the contents of said reaction vessel to about 50° to about 100° C and maintaining the temperature in this range for about 4–8 hours, and
3. recovering the product from the reaction vessel.

9. The process of claim 8 wherein about 16 to 18 parts polybutadiene are added; wherein the suspending agent is a mixture of about 0.005-0.4% by weight, based on weight of water in the reaction vessel, polyethylene oxide and about 0.007 to about 0.05% by weight polyvinyl alcohol and wherein the catalyst is tertiarybutyl peroxy isobutyrate, tertiarybutyl peroxy octoate, or tertiarybutyl peroxy pivalate and mixtures of these.

10. The process of claim 1 wherein the reaction mixture contains about 12 to 19 parts by weight polybutadiene and about 88 to 81 parts by weight of a mixture of about 15-40 parts by weight acrylonitrile and about 60-85 parts by weight styrene, wherein the catalyst is selected from the group of tertiarybutyl peroxy isobutyrate, tertiarybutyl peroxy octoate or tertiary butyl peroxy pivalate and wherein the suspending agent is a mixture of a water soluble polyalkylene oxide and polyvinyl alcohol.

11. The process of claim 10 wherein the catalyst is a mixture of teriary butyl peroctoate and tertiary butyl peroxy pivalate and wherein the suspending agent is a mixture of polyethylene oxide and polyvinyl alcohol.

12. The process of claim 11 wherein the latex is a polybutadiene latex prepared by polymerization at about 5°-15° C.

13. The process of claim 1 wherein the polybutadiene latex has a particle size of 1500-2500° A, a swell index of 85-105, a gel content of 26-37% by weight, a solids content of about 59-62% by weight, a pH of 10-11 and a Mooney (ML-4) of about 110-145, wherein the catalyst is selected from tertiary butyl peroxy isobutyrate tertiary butyl peroxy octoate, or tertiary butyl peroxy pivalate, and wherein the suspending agent is a mixture of a water soluble polyalkylene oxide and polyvinyl alcohol.

* * * * *